United States Patent [19]

Herscovici

[11] 4,329,096
[45] May 11, 1982

[54] GEAR CUTTER

[75] Inventor: Saul Herscovici, Waterloo, Iowa

[73] Assignee: Power Engineering and Manufacturing, Ltd., Waterloo, Iowa

[21] Appl. No.: 6,226

[22] Filed: Jan. 24, 1979

[51] Int. Cl.³ .............................................. B23F 5/20
[52] U.S. Cl. ................................ 409/15; 51/95 GH; 318/561; 409/12; 409/14
[58] Field of Search ...................... 409/1, 2, 10, 11, 12, 409/15, 50, 51, 14, 61, 153, 133; 51/95 GH; 408/3; 318/561

[56] References Cited

U.S. PATENT DOCUMENTS

| | | | |
|---|---|---|---|
| 2,943,538 | 7/1960 | Pegard | 409/11 |
| 2,949,676 | 8/1960 | Finnegan et al. | 409/1 X |
| 2,962,166 | 11/1960 | Miles et al. | 409/1 X |
| 3,096,686 | 7/1963 | Davenport | 409/14 R |
| 3,204,532 | 9/1965 | Budnick | 409/12 |
| 3,254,566 | 7/1966 | Bradner | 409/15 X |
| 3,267,344 | 8/1966 | McDaniel | 409/2 X |
| 3,443,341 | 5/1969 | Honda et al. | 51/95 GH |
| 3,548,172 | 12/1970 | Centner et al. | 318/561 |
| 3,634,664 | 1/1972 | Vacek | 318/561 |
| 3,746,955 | 7/1973 | Kobayashi | 408/3 |
| 3,841,198 | 10/1974 | Cornford | 409/15 X |
| 4,061,952 | 12/1977 | Dinsdale et al. | 318/561 |

FOREIGN PATENT DOCUMENTS

| | | | |
|---|---|---|---|
| 1098789 | 2/1961 | Fed. Rep. of Germany | 90/4 |
| 2206338 | 8/1973 | Fed. Rep. of Germany | 318/561 |
| 2724602 | 12/1978 | Fed. Rep. of Germany | 409/10 |
| 52-0011485 | 1/1977 | Japan | 409/133 |
| 597013 | 1/1948 | United Kingdom | 90/4 |
| 1349563 | 4/1974 | United Kingdom | 318/561 |
| 144706 | 3/1959 | U.S.S.R. | 90/4 |
| 134965 | 5/1961 | U.S.S.R. | 51/95 GH |
| 507860 | 4/1976 | U.S.S.R. | 318/561 |
| 193893 | 7/1976 | U.S.S.R. | 409/61 |
| 524628 | 11/1976 | U.S.S.R. | 409/61 |
| 581369 | 11/1977 | U.S.S.R. | 409/15 |
| 595094 | 2/1978 | U.S.S.R. | 15/95 GH |
| 602346 | 4/1978 | U.S.S.R. | 409/1 |
| 622056 | 8/1978 | U.S.S.R. | 318/561 |

Primary Examiner—William R. Briggs
Attorney, Agent, or Firm—Breneman, Kane & Georges

[57] ABSTRACT

A method and control system for gear cutting machines such as hobbing equipment, shaper cutters and bevel-cutting equipment for achieving greater accuracy, productivity, and gears of increased quality while eliminating error, tedious calculations, labor and product variation is provided by employing a control system and utilizing a method of hobbing wherein optimum hob cutter efficiency is maintained by electronically monitoring and controlling hob input power, hob shift and workpiece feed to produce gears approaching the optimum theoretical calculated configuration. The method of cutting gears and the control system provides for the production of more accurate gears by eliminating the use of cams in shaper cutters and the use of change gears in hobbing machines and by properly controlling hob shift to result in an increased hob cutter life and provide higher production of optimally designed gears.

25 Claims, 12 Drawing Figures

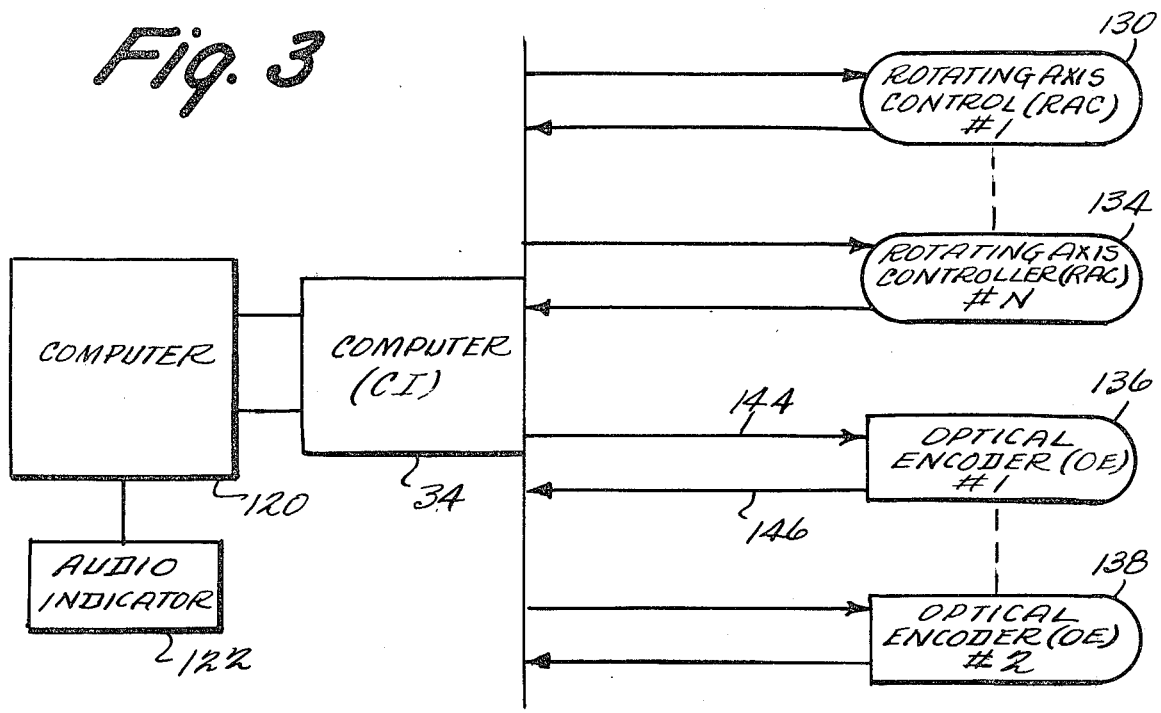
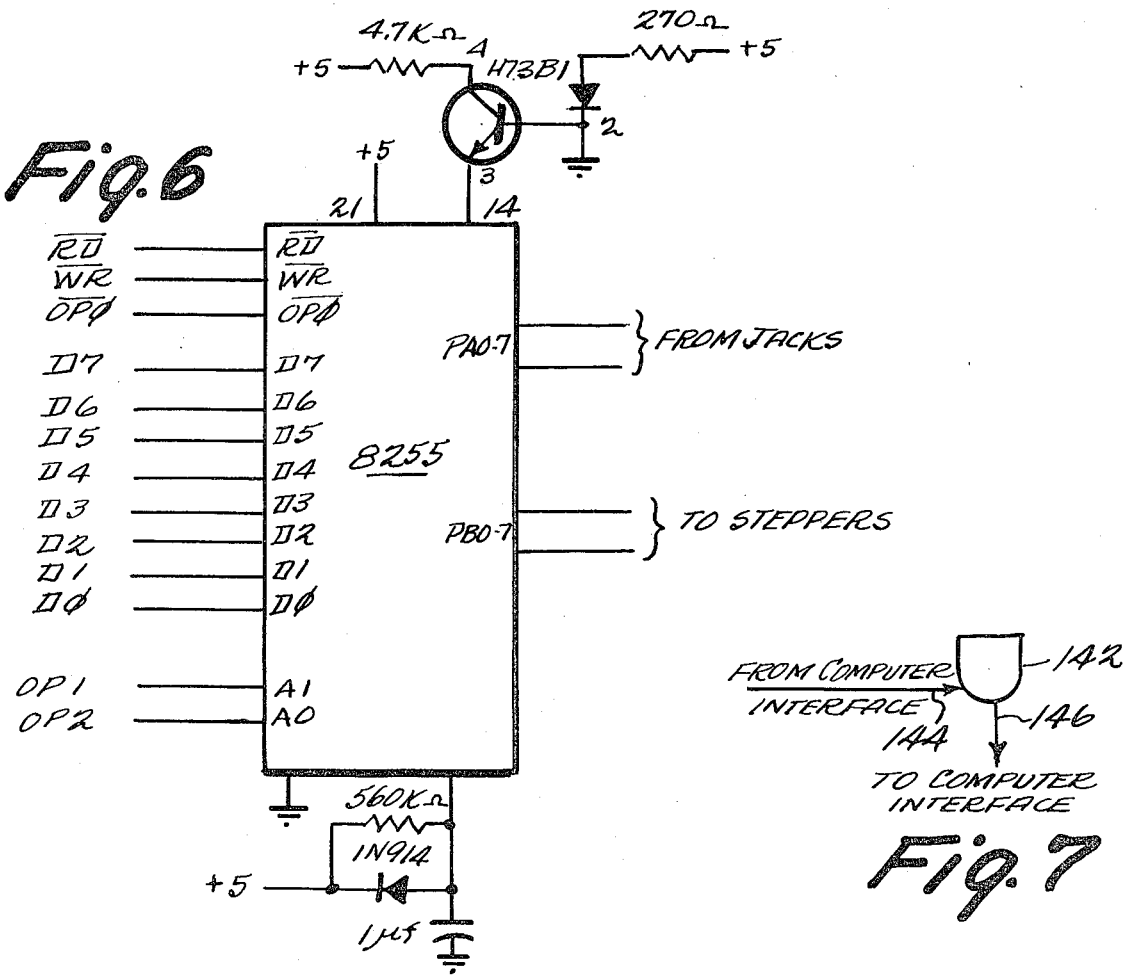

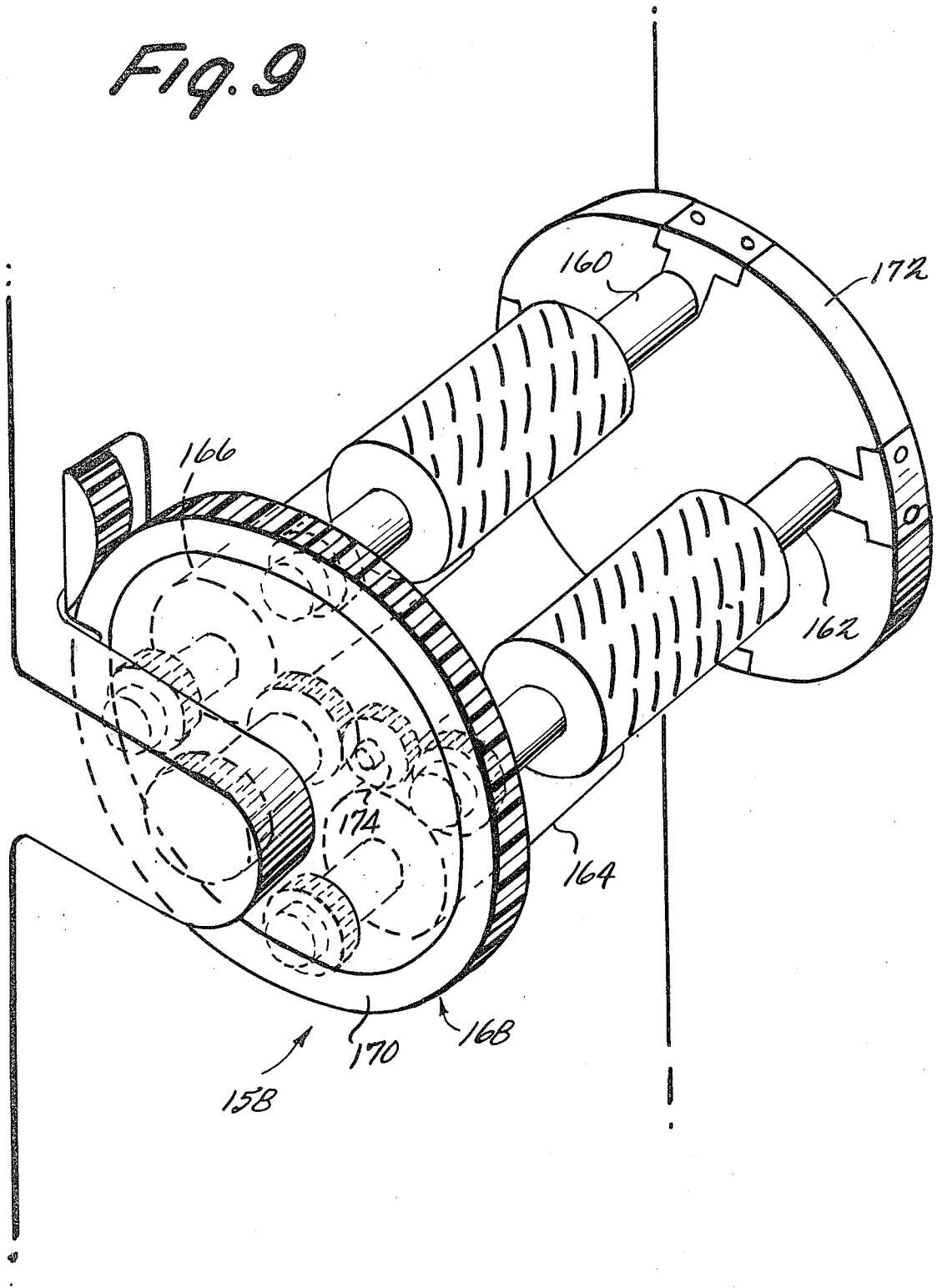

GEAR CUTTER

BACKGROUND OF THE INVENTION

1. Field of the Invention

The present invention relates to gear cutting machines and a method of cutting gears to provide gears having the optimum characteristics of tooth angle, face, proper top and bottom lands and spacing to provide gears of increased strength and of reduced operational noise levels to provide a gear of optimal efficiency for the particular application and material from which the gear is constructed. More particularly, the invention pertains to a method of gear cutting and an electronic variable speed motor and control system for controlling the cutter to obtain and maintain the proper index, helical angle and the number of starts by monitoring and controlling the cutter to efficiently cut a variety of gears for various applications utilizing a variety of metals from which gears may be constructed.

2. Description of the Prior Art

The prior art of cutting gears utilizing shaper cutters and hobbing machines includes a variety of apparatus and methods designed to improve gear cutting in the production of gears. One method for increasing the accuracy of hobbing machines has been to increase the size of the machine bed, the rotary machine table and the hob cutter to increase the gear tolerances attainable in the hobbing operation. It is well known in the gear cutting art that close tolerances including proper tooth size, diametral pitch, clearance, depth and backlash must all be controlled to not only assure proper meshing of gears but also to assure prolonged service life. These problems are further compounded in the cutting of helical and spur gears and the production of worm gears in which a change gear has heretofore been employed in the prior art to approach the proper helix angle. In these applications, and in other applications, gears are sometimes cut in at least two operations so that after the production of a rough gear, the gear is then further machined in a second machine for cutting at closer tolerances to provide the proper pitch lead and tooth profile. Under these procedures, it is possible to cut too small a gear or not cut enough material away from the gear blank thereby resulting in excessive wear of components in the second closer tolerance machine and a waste of time, labor and materials.

It is understood by those skilled in the art that the operational reliability, service life and efficiency of equipment utilizing gears depends greatly upon the precision and the quality of workmanship expended in the production of gears. In addition, it is known that service life, operational efficiency and the noise level and environmental considerations in work places utilizing machines with transmissions and gears depend upon quality, precision, and tolerances of the gears produced. Consequently, the production of gears having tolerances approaching the calculated theoretical values provides a means for the reduction of noise levels from the machinery and for providing stronger equipment.

As recognized by those skilled in the art, gear cutting is a discontinuous process that subjects the cutting machine to shock resulting in vibrations and a non-uniform toolwear that has been accommodated in prior art hobbing machines by either always setting the machine up so that the center portion of the hob cutter is utilized or by intuitive knowledge of the workman as to the amount of the hob travel generally encountered in the material of the gear blank, size and the type of gear being cut. The intermittent machining process encountered in hobbing operations provides a shock load that may result in machine vibrations and an increased random tool wear further resulting in the production of gears that do not provide the degree of tolerance necessary for optimized life and machine efficiency. As a result, such gears operate by generating more noise and are subject to fatigue, cracking and breaking.

The prior art has recognized the problems of accuracy in cutting gears and has attempted to solve these problems by utilizing larger machines having components of closer tolerance so that the travel, speed and friction imposed on the various components are more perfectly controlled to result in the production of more perfect gears. In U.S. Pat. No. 2,962,166, a gear sorting device is disclosed for the production of gears. In U.S. Pat. No. 2,962,166, the automatic gaging and sorting of the output of the machine tool is provided to alleviate a combination of defects such as errors in axial separation of the hob and gear blank, worn hob, hob shift or other such type of adjustments. Further, it is pointed out that random variations may indicate a hobbing machine adjustment even though the hob is sharp and the axial separations are substantially correct. As a result, in U.S. Pat. No. 2,962,166, the adjustments to the hobbing machine are not made until a plurality of gears have exhibited the same defect or defects. It is, of course, fundamental that making changes in the hobbing machine after the production of more than one gear may as a result of trial and error result in future gears having greater tolerances and preferred configurations. It is, however, further apparent that gears already produced may either be wasted or require further operations to put them into a usable condition.

In U.S. Pat. No. 3,254,566, an electronically controlled fluid motor powered machine is disclosed wherein an electronic computer means responsive to the rotation of the hob or cutter provides selective control by which preselected values may be correlated electronically and transmitted to actuate a lead screw and work spindle in response. However, in U.S. Pat. No. 3,254,566, the calculations and functions of the machine provide computer calculations for the speeds and relationships of the various axes involved and thereafter presume hob rotation and efficiency with respect thereto. Furthermore, hob shift and hob cutter control, which is one of the most important aspects in the production of high quality gears, are not suitably controlled. Moreover, U.S. Pat. No. 3,254,566 employs a hydraulic motor to provide a variable speed to thereby eliminate the traditional change gears. As will be recognized by those having knowledge of hydraulic systems, time lags of a few seconds are inherent in the use of fluid activated and controlled systems. As a result the response time of such systems are measured in seconds with the fluid system searching to catch up with the computerized system. As a consequence the method of hobbing provided in U.S. Pat. No. 3,254,566 does not contemplate the relatively instantaneous positive correction of errors contemplated by the present invention. In the present invention, the computer correlates and improves upon the efficiency of the gear cutting machine components such as base, bearings, feed components and rotational components to improve the quality of produced gears. However, improper machine set-up, operation and wear of the hob cutter and hobbing machine results in imperfect gears notwithstanding the theoretical calculations. As a result, the production of quality gears in the prior art has relied primarily upon the intuition of the workman cutting the gear to produce a more uniform and optimized gear by taking into account cutter efficiency, hob shift, rotational speed and the metallurgical composition of the gear blank. The resolution of this problem in conjunction with mathematical formulas and computations reveal many of the problems involved with translating theoretical computations into gears having optimum qualities.

SUMMARY OF THE INVENTION

The disadvantages and limitations of the prior art methods and procedures, including much of the work and calculation required for determining the optimum conditions for a gear and the labor required in monitoring and attempting to ascertain whether a given set of calculations are being translated into a gear having optimal characteristics are dispensed with by the present invention. The present method of cutting gears and control system for providing gears of preferred characteristics are provided for by the utilization of existing gear cutting machinery and controlling the gear cutting operation by computing not only the optimal conditions for a given type of gear but also in providing a constant monitoring and optimizing of the progress of the cutter by modifying such parameters as cutter speed, feed index, feed drive and the power required in the actual cutting of the gear from the gear blank. The variable electronic drives and controlled gear cutting machines of the invention are capable of detecting and positively correcting gear cutting imperfections within millionths of a second by varying the variable feed and/or power drives to produce gears having tolerances approaching the calculated theoretical.

The method and control system of the present invention is the product of extensive research investigations into the control, operation and techniques for optimizing the parameters necessary to increase productivity and quality of gears. The method and control system of the present invention monitors the efficiency of the hob or cutter in relation to the gear being cut and reduces set-up time and error by assuring the hob shift and relative motion of the rotary axis and linear axis are properly coordinated to produce the calculated optimized gear. The result of the constant monitoring provides higher quality gears since the present control system is designed to monitor and change the number and depth of cuts and degree of hob shift during each rotation of the hob or cutter. The present invention is not only applicable to hobbing machines but also to machines such as shaper cutters or bevel gear cutting machines to provide a higher productivity by reducing set-up time and eliminating calculations and search for proper change gears in both hobbing machines and shaper cutters and also eliminating the cams in the shaper cutter to thereby improve the quality of the gears produced, increase the life of the cutter and maintain better quality control of gears produced by eliminating human error and optimizing and providing the conditions required for the production of optimal gears.

In the operation of hob cutting machinery, use of the hob cutter results in wear and such wear affects the tolerances of gears produced and since the cutting of gears is a discontinuous process, the wear on the hob depends upon its previous use, its present condition, the material being cut and the various workpiece feed parameters.

If a large number of pieces have been run, the re-sharpening of the cutter results in a new pitch diameter which in accordance with the preferred embodiment of hobbing machines constructed in accordance with the invention is taken into account in gear cutting. In addition, the entire length of the hob cutter is uniformly utilized to provide maximum hob cutter life. As a result, the proper hob shift not only fosters proper tooth profile but also assures maximum hob cutter life. The proper hob shift varies with not only the size of the cut but also the composition of the gear blank and the rate of feed. The method of the present invention includes not only the predetermination of the permissible amount of hob shift to assure proper gear profile but also the monitoring and controlling of the hob shift, rate of feed and amount of power utilized by the hob cutter in conjunction with the size of the cut and composition of the gear blank. These inputs in utilizing the method and control system of the present invention allow adjustment of the cutter speed and feed rates in conjunction with hob shift to provide the necessary chip removal to provide gears having optimized characteristics approaching the calculated theoretical.

The method of the present invention further includes the determination of the last position of the hob cutter to provide a more uniform use of the hob cutter surface. The proper control of the hob shift allows the change of direction of hob shift during operation to complete the cutting and start a second complete cutter shift in a direction opposite the first travel. In this manner, hob shift can be continuously reversed until the cutter requires resharpening.

The present method and control system of the invention transforms the mostly mechanical gear hobbing machine and present mechanical method of indexing into an optimized system wherein a computer is employed which receives signals from electronic readout and measuring devices to control and instruct variable speed electrical motors. The state of the art system of manually measuring the workpiece and manually changing the components of the machine to achieve the desired effect during gear cutting operations is replaced by the computer in combination with electronic readout and measuring devices and electrically driven variable speed motors which perform the manual operations not only more rapidly but also with greater precision. The components utilized in the present invention include a computer for feeding information into a computer interface for monitoring and controlling measuring devices and indexing mechanisms and the control of the variable speed electric motors necessary to translate the calculated optimized gear features into actual gears produced by gear cutting machines utilizing the method and control system of the invention.

Initially, pertinent data such as the number of teeth, diametral pitch, pressure angle, machine constant, hob constant, etc., are fed into a computer which in turn performs calculations to arrive at information to be transferred to the computer interface which are optimally connected to allow the computer interface to feed information back to the computer. The computer may optionally include a printout providing an inspection list of items to be checked before commencing the actual cutting of the gear. Once the gear cutting begins, the actual progress of each of the components necessary for the production of a gear of high efficiency is constantly rechecked by the computer and necessary changes in speeds of the various drives or additional hob shift is utilized to provide an optimization of the cutting of the gear.

As heretofore discussed in regard to cutter wear, the control system of the present invention is designed to take into account the condition of the cutter and provide instructions for resharpening the cutter at a predetermined cutter dullness by monitoring the amount of power required to cut the gear in correlation to the other variable parameters. Preferably, the computer also includes inputs as to changes in the pitch diameter resulting from the resharpening of the cutter. With this information in conjunction with the center distance between the cutter and gear blank, the computer can instruct the computer interface as to how far to feed the cutter to obtain the desired gear tooth thickness. The control system of the invention can also determine how many passes to make and how much metal to be removed on each pass while determining the particular cutter action required to effectuate the desired metal removal.

A vertical readout system can be provided to provide information to the computer as to the location of the top and bottom surfaces of the gear blank. From this information, it can compute the area of space required to cut an optimized gear. In conjunction with this information, the computer can calculate the place to start the initial cut on the gear blank because the additional space for the radius of the cutter has already been taken into account. After the first pass, the cutter is instructed to retract rapid travel to the beginning of the blank for a second pass. The second pass does not have to start as far up as the first pass since there is no requirement for the allowance of the radius of the cutter. These passes are repeated until the computer detects that the gear produced meets the theoretical calculated conditions for the optimal gear. At this point, the cutter retracts to the unload position and the process begins over again until all the gears desired have been produced.

A memory storing device may also be provided so that once a gear has been cut the necessary data may be stored in the computer according to the part number. When a previously cut gear is required to be cut again, the part number can be punched in and the computer can be programmed to instruct the operator which fixture and cutter are to be used and also print out an inspection list.

The present control system and method may be optimally adapted for the mounting of two cutters to the hob head for cutting one or more sets of teeth on the gear without changing machines. This operation may be utilized, for instance, in cases where there is a need to cut more than one set of teeth on the same blank with each set of teeth having a different configuration. This may be conveniently accomplished in a modification to be discussed hereinafter in greater detail to provide a multiple set of teeth on a gear blank without having to load the blank twice or to recalculate the indexing between the two sets of gear teeth. This is particularly advantageous in situations where each of the sets of teeth on the gear blank requires a different cutter. The method of cutting gears and control system of the hobbing machine may be modified so that the second cutter may be placed in the cutting position and the second set of teeth cut on the blank automatically.

The cutter may be mounted on a motor driven ring to allow the cutter to be changed automatically to the proper angular position. A magnetic readout or measuring device may also be attached to relay information to the microprocessor for monitoring and further controlling the cutting operation of the hob. Preferably, two other magnetic readouts, one to measure the center distance between the center of the gear and the center of the cutter are utilized along with a measurement of the vertical position of the gear blank to feed information into the microprocessor to make the necessary calculations during cutting operations.

The present invention by monitoring, controlling and adjusting hob shift in relation to synchronizing the rotary axis of the work spindle or feed means and the linear axis of the lead screw provides for the production of gears having the proper index maintained during the continuous cutting operation. In addition, the computer in monitoring the cutting of the gear and changing parameters assures that the calculated equation representing the most efficient gear possible is provided during cutting operations. Furthermore, by monitoring and adjusting hob shift, the method and control system of the present invention assures that subsequently produced gears conform with previous gears so that a high degree of uniformity and reproducibility is provided by utilizing the method of hobbing in accordance with the present invention. The method of the present invention further contemplates the cataloging of the hob position with respect to the last gear cut so that the hob cutter when placed in the hobbing machine can be placed in the exact axial position with respect to the last gear produced to provide a uniform wear on the hob and assist in the production of gears that have uniformly been cut utilizing a more uniform hob element.

Other advantages of the invention will become apparent to those skilled in the art from the specification in conjunction with the appended drawings which illustrate further aspects of the novel method of hobbing and control system of the invention.

DESCRIPTION OF THE DRAWINGS

The invention will be further described in the following detailed description in conjunction with the accompanying drawings in which:

FIG. 3 is a diagrammatic layout of a suitable computer control means for controlling one of the rotational axes illustrated in FIG. 1;

FIG. 6 is a diagrammatic layout further illustrating one particular format for the interface circuitry of FIG. 5;

FIG. 7 is a diagrammatic layout of an optical encoder for fixed spread axis reference information;

FIG. 9 is a perspective view of multiple hob cutters mounted on a ring for hobbing in accordance with an alternative embodiment of the invention;

DETAILED DESCRIPTION OF THE INVENTION

Figure 1:
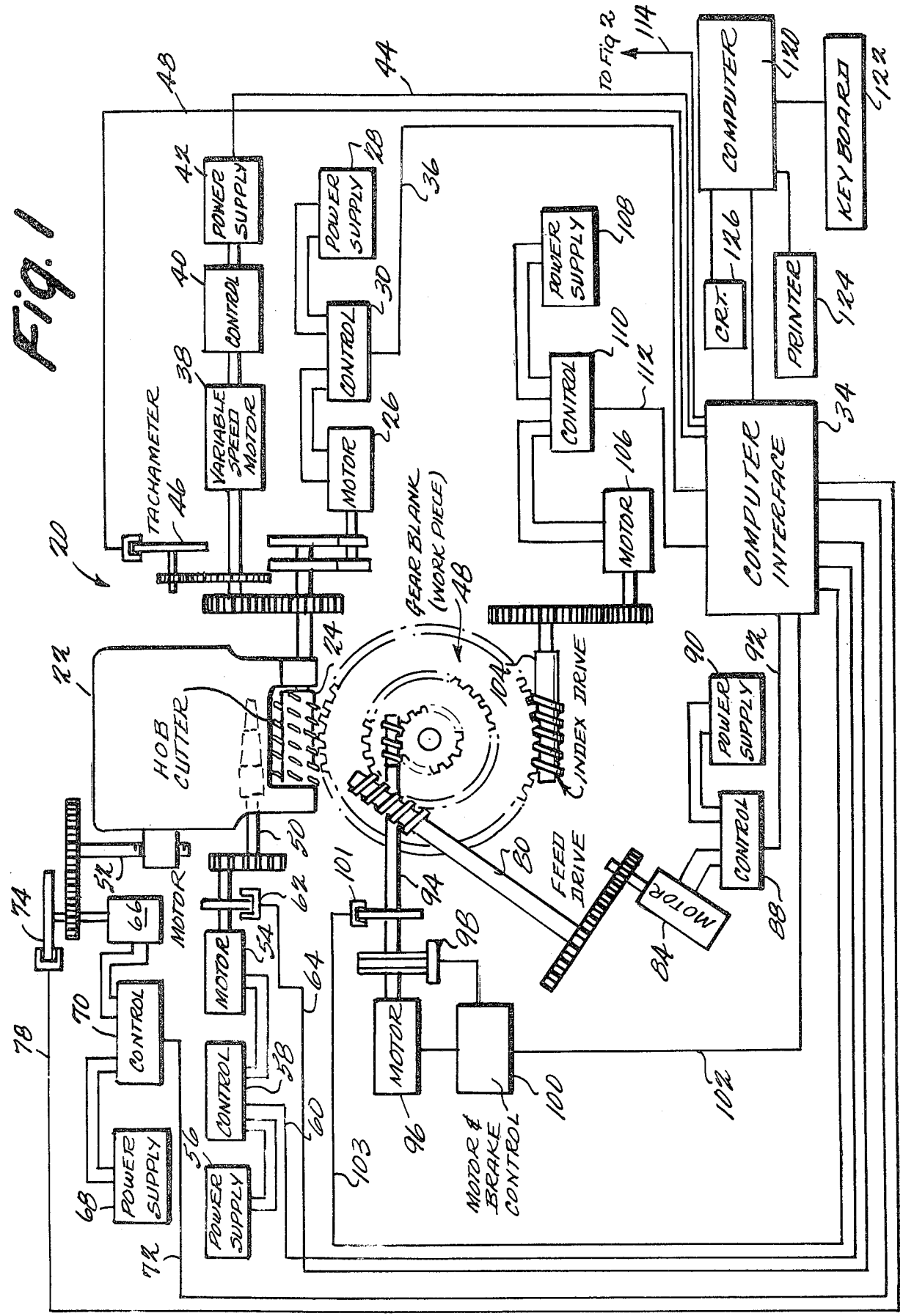
FIG. 1 is a diagrammatic illustration of a hobbing machine or the like depicting the application of a computer and control system to the machine in accordance with the invention.

The method and control system for cutting gears of the present invention in its broadest aspects eliminates the time consuming process of tedious calculation and machine set up necessary for determining angles, dimensions and the required number of teeth on gears and the traditional change gears for hob speed, hob feed, hob shift and workpiece feed and index. The traditional change gears are replaced by a variable speed electric motor and electric motor control system in conjunction with rotating axis control for monitoring cutter efficiency. The method and control system provides a particularly useful system for the production of helical gears which are generally more time consuming to calculate and cut which in the prior art, at best, have generally only approximated the dimensions of the machine gear since the helical angle obtained on gear cutting machines which heretofore employed change gears are generally slightly different than the desired theoretical helical angle. This result is inherent in the change gears which have an integral number of teeth, that is when 48.53 teeth are required to produce an exact helical angle a change gear utilizing 48 or 49 teeth must be employed to approach the theoretical desired gear configuration.

Furthermore, the physical limitations imposed by the size of the gears or the size of space available to mount the gears in a machine often make it necessary to recalculate the required number of teeth to use smaller gears. The cutting of smaller gears increases setup time and may decrease the accuracy of the helical angle thereby resulting in gears susceptible to breakage, increased wear and noise that may be obviated by the utilization of the method and control system of the invention for controlling the gear cutter and means for monitoring the effectiveness and efficiency of the cutter during its operation.

More particularly in the case of hobbing machines, the advantages of the invention are in part a function of the variable speed control of the cutter and workpiece feed in combination with hob shift which moves the cutter axially several millionths of an inch per revolution so that as the cutter becomes dull a sharp position of the cutter is brought into cutting position. The amount of the hob cutter in contact with the gear blank and resulting hob shift varies with the circumference (O.D.) of the gear blank, the number of cutter starts and the helical angle of the blank. In the preferred embodiment the helical angle is calculated with the other parameters since the smallest cutter length in contact with the workpiece takes place on the gear blanks that have the smallest outside diameter, a zero helical angle and also the fewest number of starts on the hob.

In the prior art, the hob shift overtravel tripper block must be set manually in relation to the length of each cutter length. The setting of the hob shift travel limit in the prior art has been based upon the intuitive knowledge of the machine operator or in many cases not set up at all so that the center portion of the cutter is generally preferentially used for the cutting of gear blanks. This results in a non-uniform hob wear and the production of gears that become of successively poorer quality over the life of the hob cutter.

A significant improvement in the quality of the gear and more particularly the gear tooth profile, as well as in cutter life, is obtained by utilizing the method of the present invention wherein the maximum permissible amount of hob shift travel necessary to generate the proper gear tooth profile is provided in setting up the hob cutter in relation to the gear blank. In utilizing a computer in controlling the amount of hob shift, hob shift can be calculated and thereafter automatically varied in magnitude as required by the material hardness of the gear blank and the size of the teeth to be cut. In general, it is desirable to increase the amount of hob shift as the size of the gear tooth increases and as the material machinability decreases. The monitoring of the efficiency of the hob cutter in relation to the gear tooth size and material machinability assures that the calculated, theoretical best angles and operation of the hob cutter and gear blank feed are provided during the cutting of the gear. The method of the present invention in maintaining the proper amount of hob shift in relation to the gear tooth size and machinability of the gear blanks avoids excessive wear of the hob and assures that the gear produced has the tolerances approaching the theoretical calculated values. Optionally, an automatic control over the hob shift may be provided to change the direction of the hob shift during the operation. In this manner, once hob shift has shifted completely in one direction, the hob can be reversed to provide a second complete cutter shift travel in the direction opposite the first travel. The direction of hob shift can furthermore be continuously reversed until the cutter needs resharpening thereby increasing the cutter life and assuring a more uniform hob cutter wear by utilizing substantially the entire length of the cutter. It will, of course, be recognized that hob uniformity results in gears of greater uniformity when gear blank feed, cutter angle, speed and power are monitored and controlled.

The process of the present invention further includes the monitoring and recording of the power utilized in the operation of the gear cutter in conjunction with the gear blank material and the size and the gear teeth cut on the gear blank. It will be recognized that as the cutter becomes dull, it takes more power to operate the cutter during gear cutting operations. The life of the cutter may be increased and major cutter destruction eliminated by the monitoring and recording of the power used to cut when the cutter is in a new or optimal cutting condition. When the cutter becomes too dull as determined by power input, the gear cutting machine can be automatically stopped at the end of a cutting pass, and resharpening instructions relayed to the operator. Cutter power requirements may be determined by running a sample gear with a sharp tool. This data may then be stored in the computer for comparison with future gears to be cut. In this manner, tolerances can be incorporated in the computer based system. In application of the present invention to shaper cutters the power required to operate the variable speed electric motor for providing reciprocal motion to the shaper cutter is measured and correlated in conjunction with the other parameters of gear blank feed, size of teeth, helical angle and machinability of the gear blank. Similarly, in the case of the hobbing machine the power required to rotate the hob cutter is measured and correlated with the aforementioned parameters including hob shift.

The monitoring and recording of the amount of cutting power utilized for the gear blank material in conjunction with the size of the teeth being cut along with the monitoring of the cutter rotational angular position is controlled within millionths of a second assure the most efficient cutting operation of the gear cutter is utilized during the gear cutting operation. As an optional feature of the invention, a safety switch can be utilized wherein the gear cutting machine cannot be restarted until a new cutter serial number is entered into the computer when a new cutter is required based on power inputs in relation to cutter operational efficiency, or allow the entry of the new dimensions of the cutter into the computer to indicate the resharpening of the cutter.

The information as to the dimensions of the cutter particularly in the case of the hobbing machine insures that the final center distance between the gear and cutter is properly calculated and maintained during gear cutting operations. In making short runs, hob cutters are generally of different diameter, different length, different tooth size, different lead angle so that in cutting gear blanks, one or more thread starts may be employed on the hob cutter. Likewise, the gear blank metal or consistency of the material can also vary. With these parameters taken into account, the cutter life and efficiency of the cutter may be materially increased while, at the same time, the quality of gears is significantly increased by the hobbing machine. This results in not only the production of more efficient gears but also increased productivity and reduced labor in setting up the machine and making the necessary calculations and adjustments during the operation of the gear cutting machine.

In a further optional feature of hobbing machines constructed in accordance with the invention, the hob cutter life may be further improved by recording in the computer memory the axial position of the cutter as determined by a hob shift at the end of each gear cutting. The recording in the memory of the last cutting position of the cutter makes it possible to reposition the hob cutter in the same position several days or weeks later to utilize the last cutting position of the particular hob cutter. In this way, a more efficient gear is produced since the wear on the cutter is more uniform which as a result of the uniform wear allows the other control parameters such as variable hob speed and variable feed drive to more accurately cut gears and more readily compensate for reduced cutter efficiency. However, as heretofore described, the hob cutter has a threshold at which the hob cutter must again be resharpened or replaced at which point the computer may be programmed to stop the cutting action of the hob and issues instruction to the operator to replace or resharpen the hob cutter. When the hob cutter is either resharpened or replaced, the computer calculates the center distance between the gear blank or workpiece and the cutter and directs the cutter or workpiece positioning device to move toward that center distance in one or more steps. In this manner, the method of the present invention may utilize one or more passes in cutting gears to provide gears of varying quality. Optionally, the method of the present invention may be utilized to calculate the optimum gear angles and parameters required to cut a gear in one cutting operation.

It will be recognized by those skilled in the art that good surface finishes of high precision in quality gears are generally obtained by a shaving operation. The present invention dispenses with the need of the shaving operation while maintaining the precision and quality of the gear in that the machine may be programmed to make a final cut of a total depth of several thousandths of an inch to provide a gear with a good surface finish. The final cut which provides a gear with a high quality surface finish can be achieved by directing the computer to position the cutter in a stepped motion toward the calculated center distance between the cutter and the workpiece. Several cutting passes, as well as the final size, may be attained without stopping the machine as the computer can be programmed to execute these cutting position operations. Currently, the final size of the first cut of a gear is obtained by making several extra cutting passes to avoid excessive cutting and to produce too small a gear. This results in current state-of-the-art procedures requiring the machine to be stopped between passes for the operator to make manual measurements to determine the required amount of cutter advancement for a final cut.

The present invention may further include monitoring of the axial position of the side faces of the gear in relation to the center and outside radius of the hob cutter. In the first cutting pass, the workpiece may be automatically positioned at a minimum distance above or below the cutter center as initial contact between the cutter and the workpiece occurs at the outside diameter. In this manner, further computer control of the hobbing machine may be attained to compute and control and vary the width and disposition of the teeth provided on the gear blank.

The computer control system of the invention in driving a variable speed motor provides control of the cutter's speed to attain the desired surface cutting speed to assure the proper amount of chip removal in conjunction with hob shift sharpness of the hob cutter and tooth cut size in relation to the material comprising the gear blank. As will be recognized by those skilled in the art, the number of cutting teeth or gashes on the circumference of the cutter also influences the amount of material being removed per revolution of the hob cutter. The blank feed of the gear which is normally determined by the feed advance per gear revolution is controlled in accordance with the invention to achieve the desired shaving thickness per tooth. Once the computer is programmed with the number of teeth per hob circumference, the computer can calculate the amount of feed per revolution. Thereafter, the correlation of cutter power and rotational angular position in relation to gear blank feed and index can be utilized to vary cutter shift or cutter power on a combination thereof within millionth's of a second to assure the calculated gear configuration is reproduced in the resulting gear.

The present invention is applicable to a wide variety of gears including worm gears in which a gear face length measuring device assists in determining the axial position of the hob cutter for cutting of worm gears. The rapid travel of the hobbing machine can be used to position the blank against the cutter as required in the designed position of the gear center. As such, worm gears can be cut with the milling cutter to make a low number of starts. The elimination of change gears simplifies the procedure for milling worm gears because a large number of gear starts heretofore required and the space availability have been reduced by the utilization of a variable speed electric motor coupled with the computer which monitors hob efficiency, angle and the cutting of the worm on the gear blank.

Computer and electric control of the hob cutter, workpiece rotation, as well as the motion of the workpiece past the cutter, results in a more versatile hobbing machine which may be utilized to mill straight side teeth by use of milling cutters. Furthermore, application of a computer as the integral part of the hobbing machine allows the calculation of the gear design and a verification that the hobbing machine is actually cutting the gear as designed is provided by the optical encoder and computer interface. In addition, if any time during the cutting of the gear, if the design parameters are outside the limits set by the computer, the computer can be programmed to provide a printout of the deficiency and a proposed solution. The program and apparatus of the invention may also be designed so that cutting action will not again be initiated on the workpiece until an overriding button or additional instructions are programmed back into the computer.

In many instances, standard gears are utilized in production line equipment which do not always require a recalculation of their geometrical configuration. In addition, orders for such gears do not specify such things as tooth thickness or dimensions over pins or even outside gear diameter. In the cutting of such teeth on a gear, the final size is generally determined by the dimension over pins or caliper measurements over several teeth. In such cases, the present invention may be utilized wherein the circular tooth thickness will be calculated and printed to determine the cutting position of the hob cutter. The program of the computer may conveniently be designed to simultaneously calculate the distinguishing characteristics and parameters of the gear being cut, as well as the mating gear, so that the set of the gears can be cut to properly mesh on a given center distance.

The method of cutting gears in the preferred embodiment employs a computer into which certain cutter input information is programmed to provide the automatic system of gear cutting. This cutter input information may include supplying to the computer the following information:
1. Hob Outside Diameter
2. Dimension over pin
3. Pin diameter
4. Number of gashes
5. Hob lead angle
6. Hob diametral pitch
7. Hob pressure angle
8. Hob Tooth Whole Depth
9. Hob serial number
10. Hob number of starts
11. Hob direction of helix
12. Hob tip radius
13. Gear material
14. Desired shaving thickness In addition, certain basic parmaters as to the specific type of gear to be cut are included in the input information and may be as follows:
1. Gear number of teeth
2. Normal diametral pitch
3. Nominal normal pressure angle
4. Working pressure angle
5. Helix angle
6. Direction of helix
7. Outside gear diameter Furthermore, information as to the mating gear may be programmed into the computer and may include:
1. Number of teeth in mating gear
2. Outside diameter
3. Center distance With respect to the information on the mating gear, one other characteristic of the mating gear would be required. This information would be:
A. Dimension over pins and pin diameter; or
B. Desired normal tooth thickness; or
C. Standard tooth thickness.

From this information, the computer is equipped to calculate the preparation of a gear from a gear blank and to detect errors in setup. Furthermore, the computer may be programmed to provide a display of possible errors in setup such as:
1. Hob cannot be started. Face near tailstock is—inches too close to tailstock.
2. Hob cannot be started. Face near spindle is too close to spindle. Add—inch spacer.
3. Resharpen cutter. Cutter is too dull.

As a result of the computer controlled linear motion of the cutter and workpiece, it is possible to start the cutting action by cutter infeed, workpiece feed or combination of both. In addition, the rate of feed can also be varied. At the end of cutting, it is possible to dwell (no workpiece feed) while the cutter is in line with the end face of the gear. Shavings that are partially broken by the deburring tool can further be broken away by the gear cutter. The computer control over the linear motion of the cutter and workpiece travel makes it possible to obtain a coordinated motion that may be utilized in cutting a wide variety of gears and providing a number of different and involved precision machining of workpieces. As a result, the control system of the present invention allows:
1. A variation of the center distance between the workpiece and the cutter to provide cutting in both directions to produce crown hobbing;
2. A gradual variation of the center distance between the cutter and the workpiece in one direction only to produce a tapered gear; and
3. The movement of the hob cutter in and out as the workpiece is fed past the cutter to cut bevel gears.

As will now be recognized by those skilled in the art, a high degree of precision and reproducibility may be achieved by utilizing an electrically controlled variable feed and index drive in combination with the variable hob speed and hob shift and the monitoring of the cutting power to achieve the advantages of the invention. It will be further recognized that the utilization of the electronic drive on the index mechanism allows the index mechanisms to be operated while the main drive motor is not operating. This provides a means for a better reindexing of a gear that may be subsequently returned to machine in the event further machining or finishing is desired. This advantage may also be utilized in the event one face of the cutter leaves a rougher surface on one of the gear teeth due to the face angle of the gash in relation to the workpiece and the workpiece motion which may result in power surges or drops or other unusual conditions that might be encountered in hobbing operations. This feature of the invention can also be used to rotate the gear blank prior to the finishing cut to improve the surface finish.

It will be further recognized that having the ability to electronically rotate the indexing motor allows the operator to inspect the workpiece arbor concentricity prior to inserting the gear blank and provides a much safer environment as the cutter or other functions will not operate. In a mechanical drive the cutter and index drive rotate simultaneously.

In an alternative embodiment, the present invention may, with minor modifications, be adapted to bevel cutting equipment and shaper cutters. It will be recognized that in shaper cutters, the same aspects of the present invention are utilized but in a slightly modified form. In hobbing machines gears are cut utilizing a rotary motion, while a shaper cutter employs a reciprocal motion to provide the cutting action on the workpiece. As in the case of the hob, the present invention contemplates the computer control of variable speed electric motors and the measuring and monitoring of the power necessary to provide the reciprocal action of the shaper cutter. Furthermore, like the hob, the shaper cutter employs a similar optical encoder system for monitoring the position of the shaper cutter and means for measuring the power necessary to provide the cutting action of the shaper cutter and correlating the power with variables such as feed, index and cutter shift and gear blank material to attain the predetermined gear profile.

The shaper cutter in the cutting spur gears or gears with straight teeth employs a reciprocating motion along a plane that is parallel with the center line of the gear. Indexing for the shaper cutter is provided for in a manner that is similar to the indexing provided for in the operation of the hob cutter. As in providing for indexing with the hobbing machine, it is necessary to calculate the number of teeth on each gear to obtain the proper indexing for the shaper cutter. Helical gears may also be cut by eliminating the traditional change gears heretofore employed and utilizing and correlating the variable speed electric motors for index (rotating the gear blank) and rotational drive of the shaper cutter as it reciprocates to match the angle of the desired helical gear. In the prior art, this action of the shaper cutter was achieved by utilizing a special set of cams, inside the head of the shaper cutter. Each cam had to be precision made having an angle to match the angle of the helical gears being cut.

The prior art cams employed in the shaper cutter were not only expensive but involved considerable machine down time when a change in helical angle was required. In the prior art utilization of cams in the shaper cutter, resulted in the shaper cutter head having to be disassembled to remove one set of cams to replace them with a new set of cams for a different angle. The utilization of the present invention to shaper cutters therefore not only provides a preferred shaper cutter but also eliminates the significant investment in making the set of cams and the tremendous amount of down time that was heretofore required in changing the cams for different angles.

The present invention provides not only for the elimination of the prior art cams but also replaces the change gears heretofore utilized by both the hobbing machines and shaper cutter to provide a more economical shaper cutter by using the novel method and control system for gear cutting machines. More particularly, in the application of the method of the present invention to shaper cutters, one or more sensors are employed to feed information into the computers as to the vertical position of the cutter to provide information to the computer to correlate with the rotational motion of the cutter necessary to generate the desired helical angle, and to move back on a reciprocating stroke on the same angle so that the cutter can start a new shaving, and a new cut. The computerized system of the shaper cutter includes a means for correlating the position of the cutter with the position of the gear and give an angular rotation to the cutter. The need for specific helix angle cams are eliminated by use of variable speed electronic drives that correlate the cutter's axial position with the helical angle position and with the teeth indexing position. In order to generate that angle of the helical gear, the computer controls and correlates the vertical position of the cutter and the angular position of the cutter. The angular motion is controlled by the rotation of a controlling disk mounted on the cutter support.

The variable speed workpiece driving motor provides the workpiece angular position as determined by the sensor disk on the cuttershaft and by a vertical sensor that feeds information to the computer which in turn calculates and determines the cutter motion.

A further modification of the invention allows the shaper cutter to cut either spur or helical gears without the use of the traditional helical gear mechanisms heretofore employed in shaper cutters. This modification utilizes a mechanism in the shaper cutter to maintain the tooth relationship between the cutter tooth and the tooth of the gear. This mechanism can be arranged in much the same manner as has been utilized in the hob. One such means contemplates the control of one of the members such as the workpiece or the cutter by the computer based upon inputs from the sensor. The other member (either cutter or workpiece) would be driven to obtain indexing to a tolerance sufficient to provide the tolerance required in the gear cutting art. A second set of indexing mechanisms may be employed in order to generate just the helical angle in a similar way to the cams now being used, only this would be a computer controlled motion and would be achieved by utilizing electrically driven variable speed motors. In this embodiment, a vertical readout device or optical encoder similar to the one described with reference to the hobbing machine senses the vertical position of the cutter, and responds to signals to the computer to correlate the vertical position to the computer to correlate the vertical position to the angular position of the helical gear. In this manner, as the cutter moves in an up and down stroke, the vertical part that reads the vertical position and feeds the signal to a rotating disc, that is mounted on the body that supports the cutter and the signal from the vertical readout device and the signal from an angular position disc are fed into a computer that calculates and determines the angular position to provide the required helix angle.

On the return stroke from the cutting stroke, the cutter again travels in a reverse angular rotation to maintain the cutter in the proper angular position. Normally, shaper cutters for helical gears are made with the angle tooth of the cutter, at the same angle as that of the gear, and as a result it has been necessary to have a special cutter for just about every angle within the limits of several degrees or whatever the cutters can be made to operate. The present arrangement of the angular program that controls the position of the shaper cutter with the ability to go back and return over the path at which it moves at an angle to generate the gear results in a shaper cutter that cuts helical gears without the use of cams and eliminates the down time required to take one cam out and put another one back, in order to change the angle. Furthermore, the present method and shaper cutters constructed in accordance therewith provides versatility to a family of cutters, that can be used for a large number of angles.

The mechanical and electronic drive for making helical gears in the shaper cutter can be further simplified by unifying the workpiece and helix angle drives into one drive system. Having the computer direct the rotational motion of workpiece and cutter enables the shaper cutter to calculate and direct the workpiece index rotation and cutter rotation to provide the cutter rotation motion for index and helix angle with a single electronic drive.

In the preferred embodiment of the present invention the power necessary to cut gears that is monitored and controlled in accordance with the invention, is measured and controlled by measurement of the amperage required to drive the cutter. It will, of course, be recognized that other methods of measuring and controlling power input to the cutter will occur to those skilled in the art, such as by torque force measurements and the like, all of which are contemplated in practicing the method of the present invention. In the case of the hob cutter, the amperage of the hob cutter that is required to drive the cutter at a constant speed, is monitored and controlled, whereas in the case of the shaper cutter, the power necessary to operate the motor at a constant speed to provide the reciprocal movement is monitored and controlled.

Referring now to FIG. 1, reference character 20 denotes a hobbing machine and control system for cutting gears in accordance with the invention. The modified hobbing machine 22 includes a hob cutter 24 having a variable speed motor 26, a power supply 28 and control 30 is provided for driving hob cutter 24. Control 30 is coupled to computer interface 34 via lead 36 to control the operation of the cutter to millionths of a second as heretofore described.

Hob shift is provided for hob cutter 24 by an electrically driven motor 38, which similarly includes a control unit 40 and power supply 42 coupled to computer interface 34 via lead 44. A tachometer 46 is provided to determine the amount of hob shift utilized in the actuation of variable speed motor 38 and provide information to computer interface 34 via lead 48. Hob shift for cutter 24 in combination with inputs from the tachometer 46 and means for measuring and correlating power utilized in the cutting of the gear are modified in conjunction with feed rate as will hereinafter be described in greater detail to maintain the efficiency of the cutter. It will be recognized by those skilled in the art from the foregoing discussion that cutter speed and hob shift are also affected by cutter angle and also index and feed drive which are all preferably coupled with computer interface 34.

Hob cutter angle and hob cutter position with respect to blank gears 48 and controlled by drive means 50 and 52 respectively. Drive means 50 for controlling the angular position of hob cutter 24 includes a drive motor 54, a power supply 56, and a control unit 58, which are connected to computer interface 34 by a lead 60. A tachometer 62 for providing computer interface 34 with the angular position of hob cutter 24 is also coupled with computer interface 34 via a lead 64. Similarly, the position of hob cutter 24 with respect to the center of gear blank 48 is controlled by drive means 52. Drive means 52 includes a motor 66 powered by a power supply 68 and a control unit 70. The control unit 70 is coupled to computer interface 34 via a lead 72, and a tachometer 74 for providing information to computer interface 34 as to the distance of hob cutter 24 is attached to computer interface 34 via lead 78 to provide data to the computer for setting up and maintaining the proper distance of the hob cutter to the center of gear blank 48. In this manner, the proper angular position and distance of the hob cutter 24 with respect to gear blank 48 is controlled and correlated by measurements of tachometers 62 and 74 in conjunction with the variable speed electrically driven motors 54 and 66.

Figure 2:
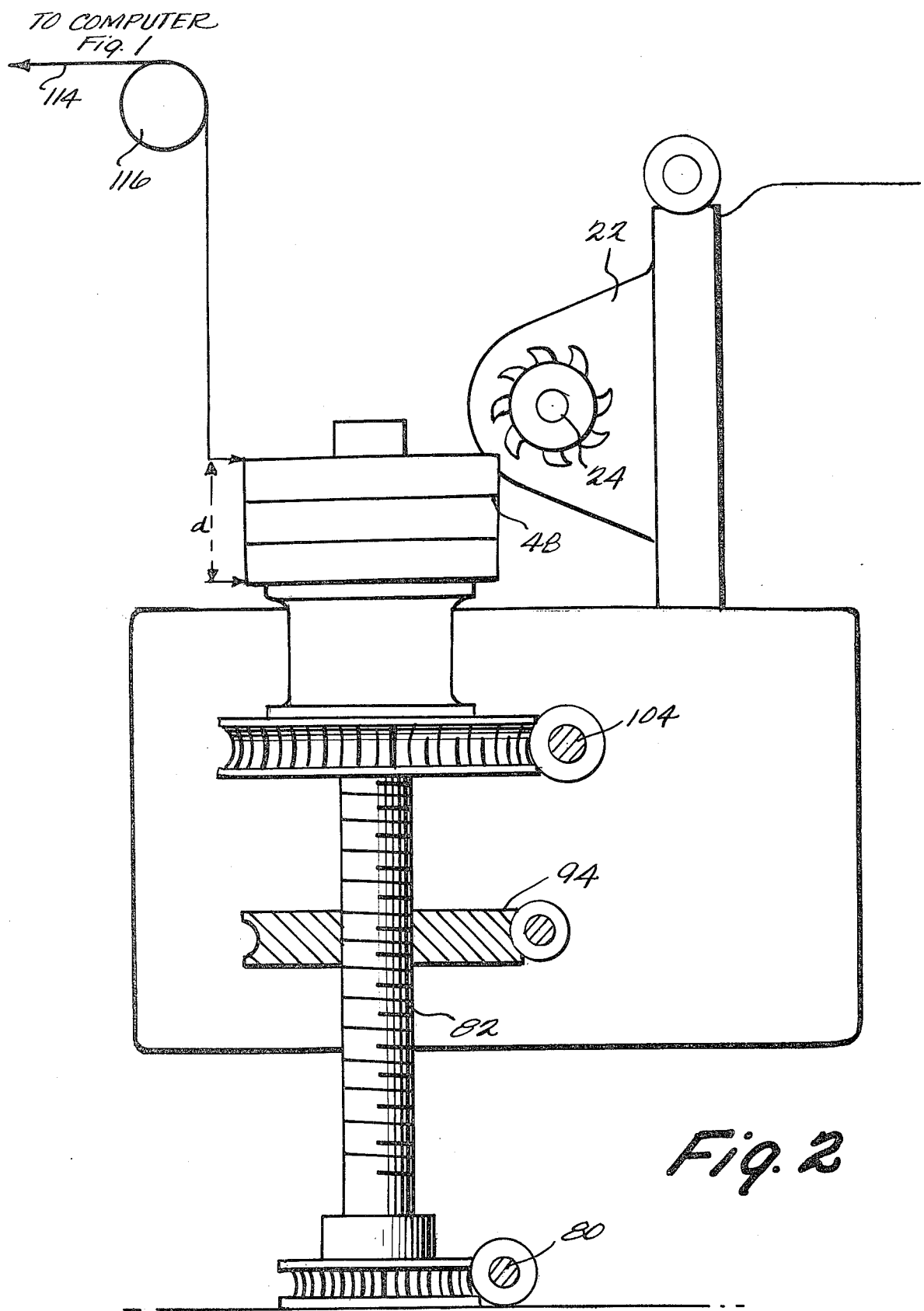
FIG. 2 illustrates a diagrammatic side view of a hobbing machine or the like of FIG. 1 illustrating the application of a computer and control system for measuring gear side faces to prepare gears of a configuration approaching the calculated optimum.
Figure 4:
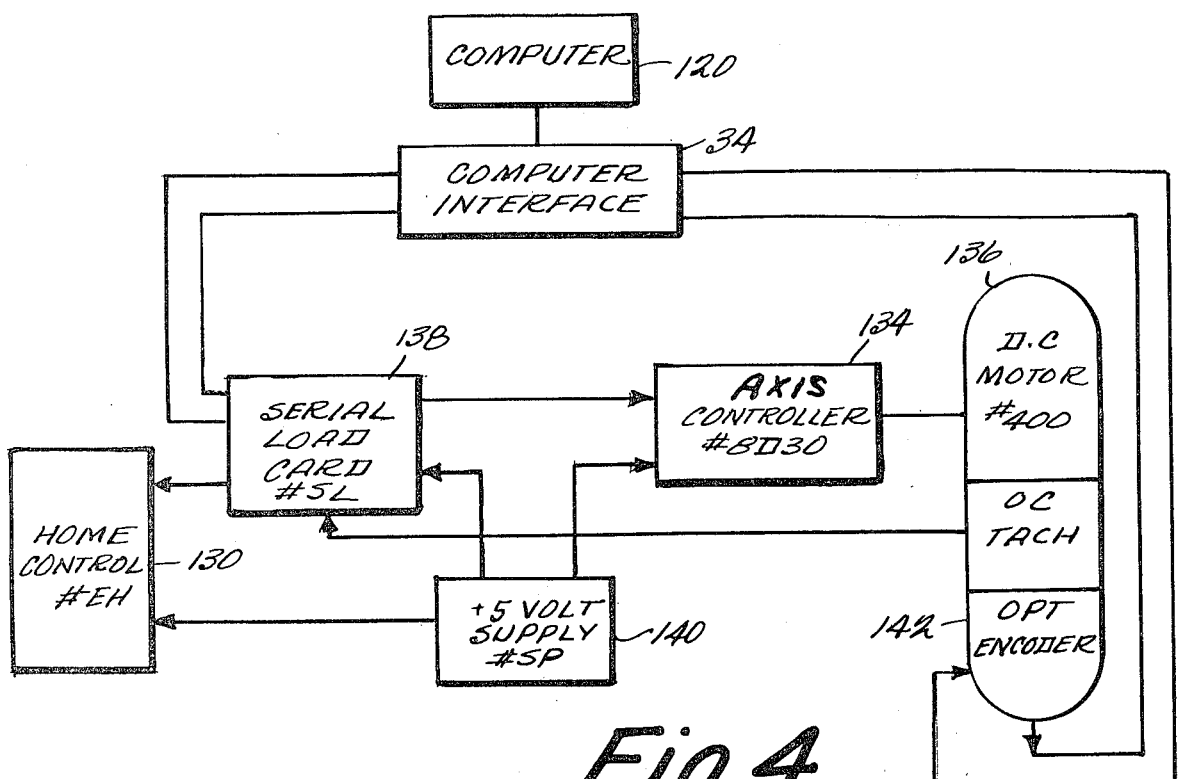
FIG. 4 is a flow chart illustrating the rotating axis control system and components for the control of one of the rotational axes as depicted in FIG. 1.

Referring now to FIGS. 1 and 2, the feed of the gear blank 48 in relation to hob cutter 24 is illustrated. The rapid feed drive 94 of gear blanks 48 provides a fast vertical movement of blanks 48 for movement along inclined plane 82 that includes a rapid travel motor 96, a control unit 98 which includes a motor and brake control for a standard electrical motor 96. A brake unit 98 is connected to motor and brake control 100 which is operatively connected to computer interface 34 via lead 102 to provide along with slow feed drive 80 information to computer interface 34 as to the vertical position of gear blank 48. Motor and brake control unit 100 is connected to computer interface 34 via lead 102. A tachometer and sensing device 101 for providing information to control the position of inclined plane 82 is connected to computer interface 34 is provided via lead 103. In operation slow feed drive 80 is generally utilized to operate inclined plane 82 by utilizing a motor 84. Variable speed electric motor 84 includes a power supply 90 and a control 88 for controlling the feed of gear blanks 48 during the operation of the hob cutter. Control 88 is operatively connected to computer interface 34 via lead 92 to allow the computer to control the operation of feed drive 80 in conjunction with the operation of hob cutter 24.

An index drive 104 is provided for rotating the gear during the cutting operation to assist in the cutting of teeth on gear blank 48 which includes a variable speed electric motor, 106, a power supply 108 and a control unit 110 which is connected to computer interface 34 by a lead 112. Also interconnected between computer interface 34 and hobbing machine 22 is a lead 114 which includes a length measuring means 116 for determining the thickness of the length d of the side faces of gear blank 48 and monitoring the position of the starting and finishing faces of gear blank 48 as it is cut by hob cutter 24.

Computer interface 34 is preferably associated with a computer 120 which includes a keyboard 122 to receive information from the operator of the hobbing machine as to the type of gear to be cut, and a printer 124 and a cathode ray tube 126 to provide the operator with information as to machine set up, operation and the requirements of the machine such as for sharpening or replacement of the hob cutter of errors in positioning the tailstock and spindle to the gear face.

Referring now to FIGS. 3, 4, 5, 6, and 7, the computer 120 may optionally include an audio indicator 122 which may be a sonalart or speaker to provide an indication of errors resulting from improper machine operation. Computer interface 34 is associated with computer 120 to receive inputs and control each of the axis heretofore discussed with reference to FIG. 1. For the purposes of illustration, only one of the rotating axis control systems will be described, it will of course be understood that each of the rotating axis may be similarly controlled. In computer interface 34 rotating axis control 130, rotating axis controller 134, and optical encoders 136, and 138 are provided. The controller 134 may be any number of controllers available on the market and known to those in the computer art such as for example on 8030 controller manufactured by Aerotech, Inc. of Pittsburgh, Pa., motor (400) with the serial load cart (SL) 138 home control (EH) 130, voltage supply (SP) 140 and optical encoder 412 may all be components from Aerotech, Inc. with the model numbers appearing in parenthesis. Each optical encoder 142 is designed to interface with computer interface 34 via leads 144 and 146 to monitor and provide information to the computer interface as to the progress of the gears being cut.

Figure 5:
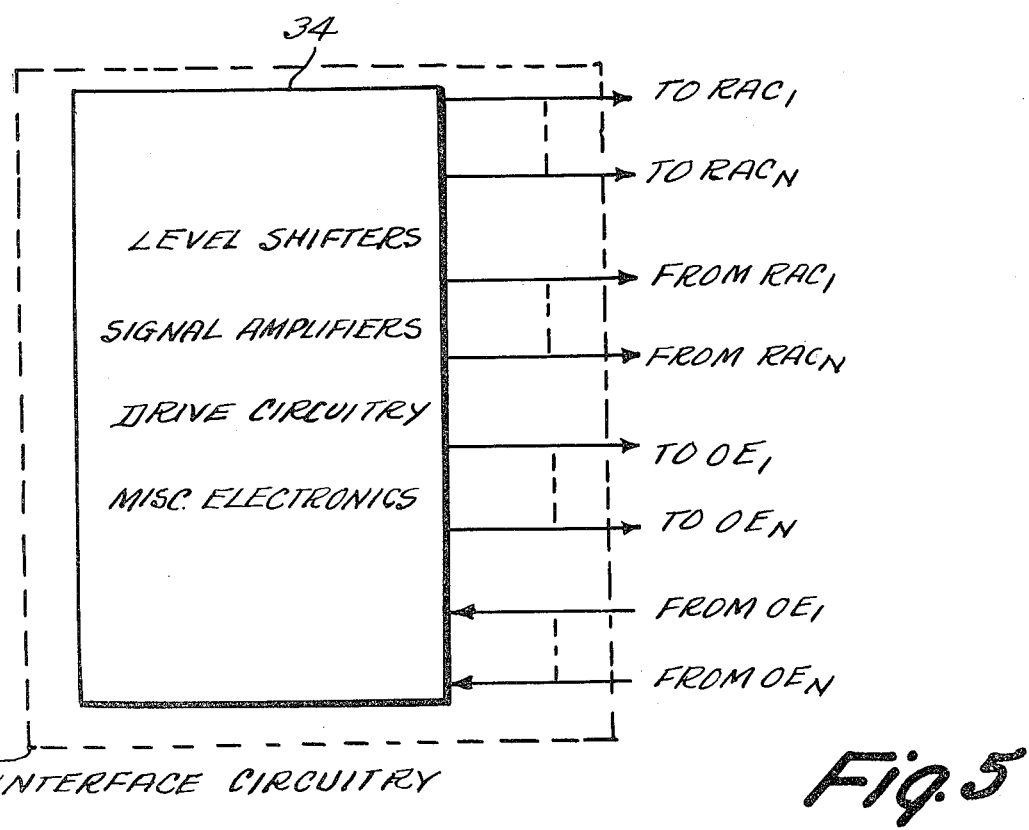
FIG. 5 is a flow chart of the interface circuitry of a computer system in accordance with the invention.

In FIGS. 5 and 6, the components of the computer interface 34 are more fully illustrated. In FIG. 6 the level shifters, signal amplifiers, drive circuitry are more fully illustrated. It will be recognized that a general purpose microprocessor of the type described are readily available on the market such as the PET model microcomputer manufactured by Commodore. A suitable computer interface includes an 8255 circuit such as manufactured by Commodore for each of the stepper motor controllers 134 and inputs from the control units 130.

Figure 8:
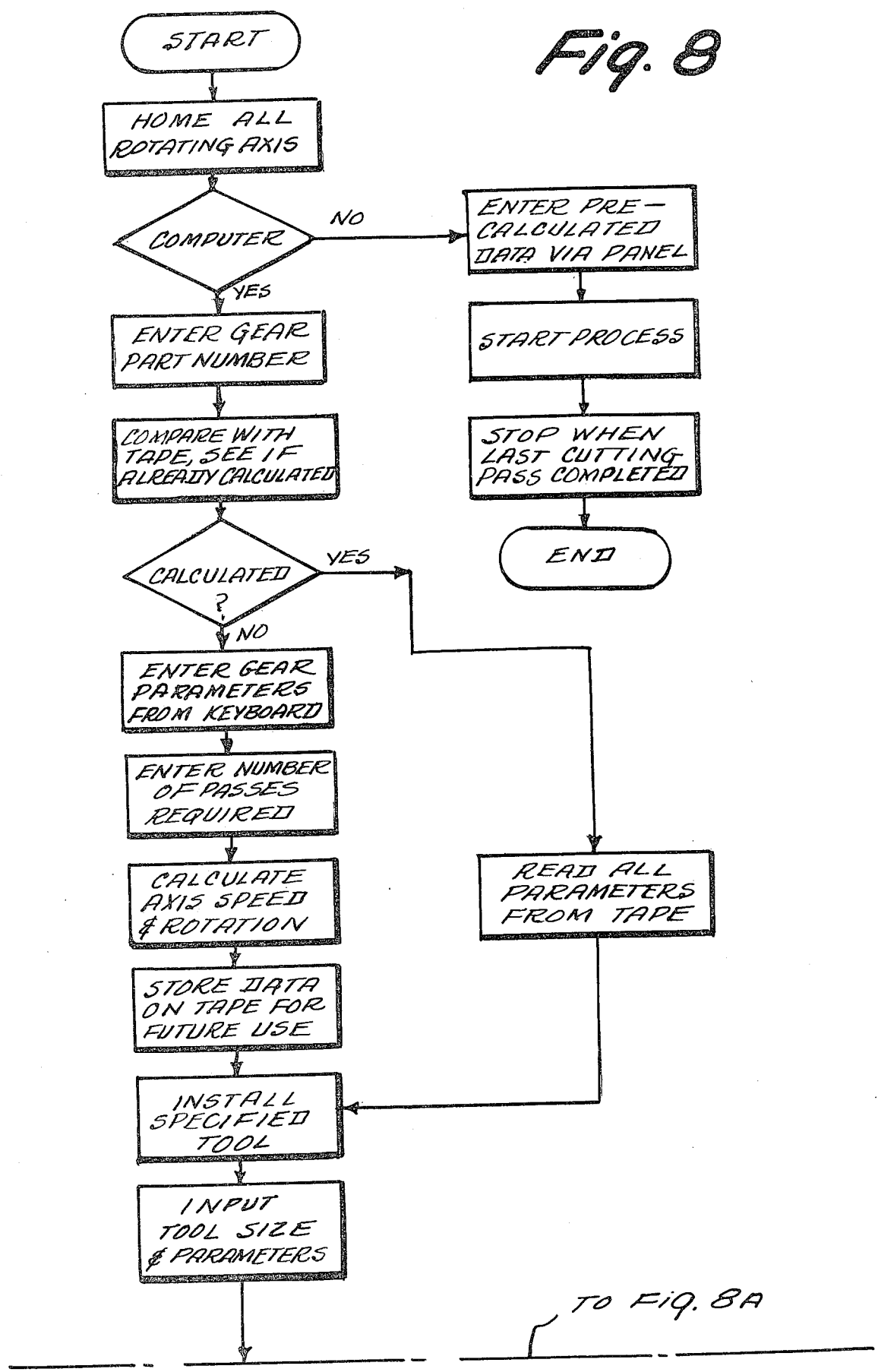
FIGS. 8 and 8A represent a flow chart of one form of a logic system for hobbing in accordance with the invention.
Figure 8A:
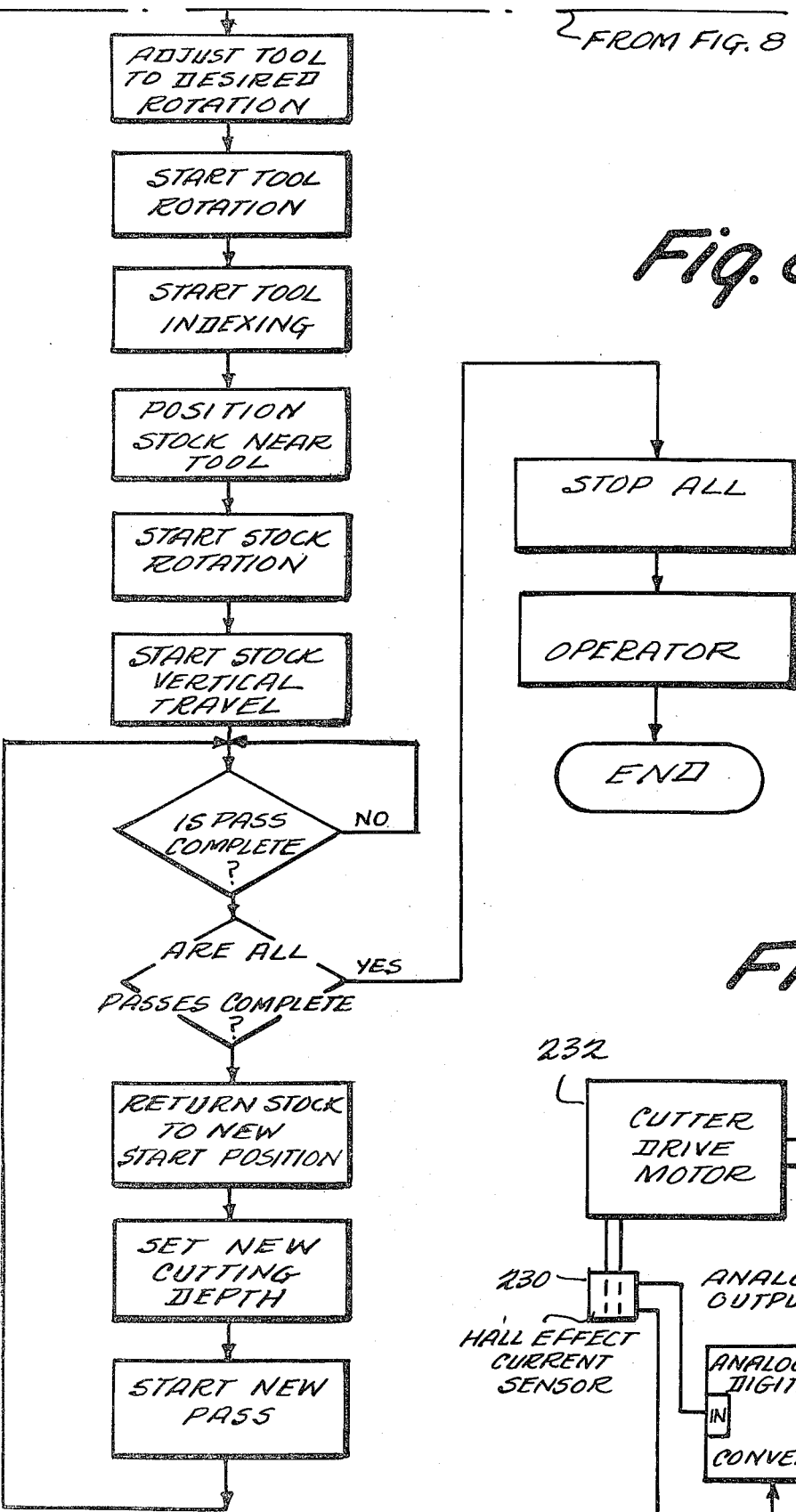

FIGS. 8 and 8A depict a general software which may be illustrated for the programming of the computer. The control system of the present invention may employ a tape or similar memory device to reproduce gears previously produced or calculate the set up for producing a new gear having the desired qualities by utilizing hobbing machines and the method of hobbing of the present invention.

Referring now to FIG. 9, a hob cutter 158 further modified in accordance with the invention is illustrated wherein a plurality of hob cutters 160, 162, 164 and 166 are mounted to a hob cutter ring 168. Hob cutter ring 168 includes two disk like members 170 and 172 for axially positioning the plurality of hob cutters 160, 162, 164, and 166 with respect to the workpiece. Once the hob cutter is in the proper axial position with respect to the workpiece as for example cutter 162, a cutter drive 174 engages cutter 162 and monitors and controls power input and hob shift in conjunction with the number, type and material from which the gear is being cut as heretofore described in accordance with the invention.

Hob ring 168 may be designed to fit into an existing hob cutter 22 (FIG. 1) or a larger hob cutter frame designed to accommodate hob rings of various sizes. In the preferred embodiment of hob cutter ring 168 means is provided for adding or removing hob cutters at about the position of hob cutter 166. Cutters 160, 162, 164 and 166 can be of the same size where speed of production is required in cutting gears or may be of different sizes. The utilization of different sized cutters on hob cutter ring 168 provides a more efficient hobbing machine where more than one set of gears having a different size and number of teeth are to be cut on a gear blank. In such instances, the computer can be programmed to cut both sets of gears and, after the first set of gears are cut, the computer is programmed to direct the rotation of the ring to place a second cutter in contact with the gear blank to begin cutting the second set of teeth.

Figure 10:
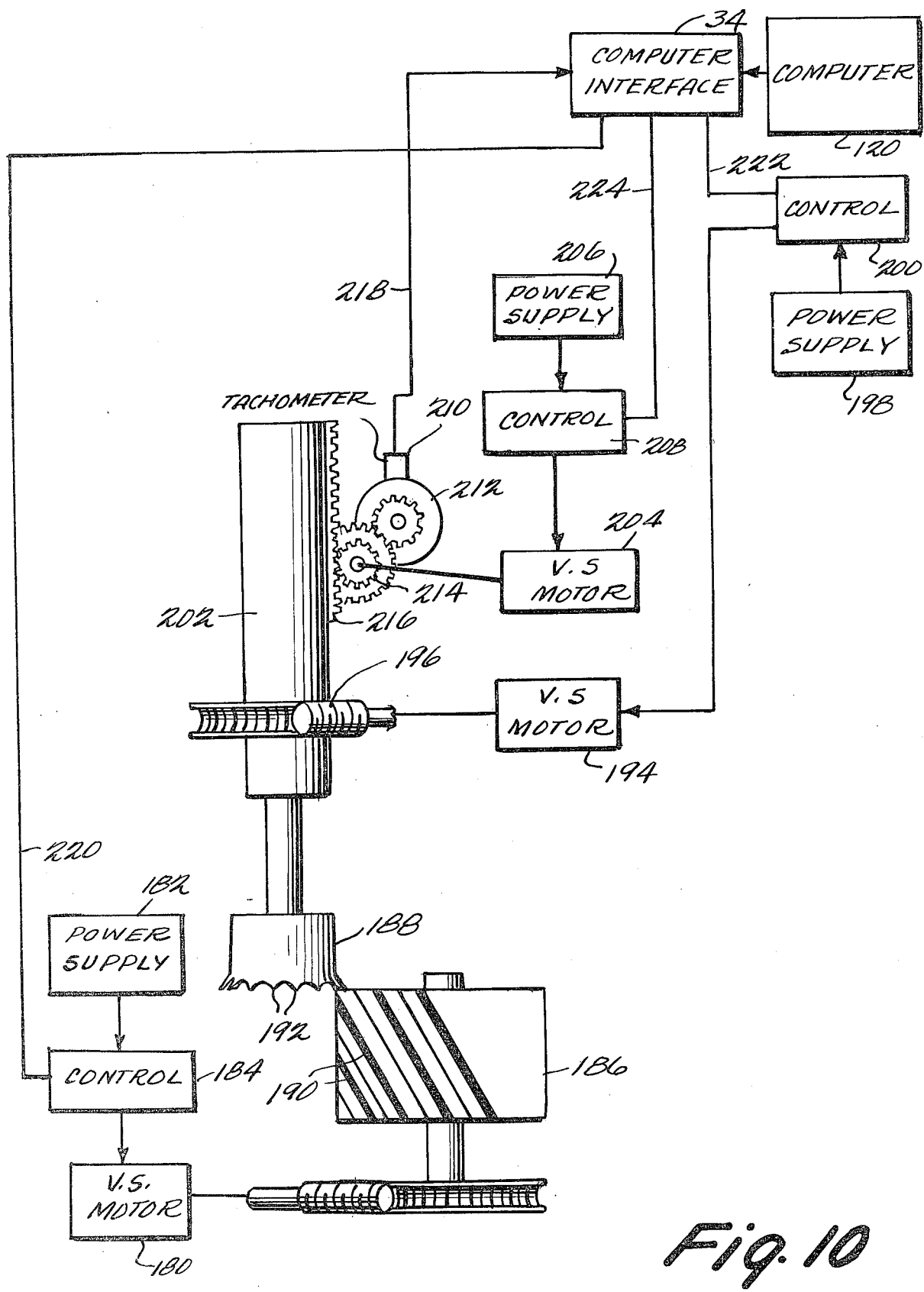
FIG. 10 is a diagrammatic illustration of a shaper cutter depicting the application of a computer and control system to a shaper cutter in accordance with the invention.

FIG. 10 illustrates the application of the method of cutting gears of the present invention to a shaper cutter. The shaper cutter, like hobbing machines assembled in accordance with the invention, includes a variable speed electric motor 180, a power supply 182, and a servo-controller 184 similar to the one illustrated and described with reference to FIGS. 1 and 4. Control 184 provides for a variable rate of rotation of gear workpiece 186 in response to the type of teeth being cut by the shaper cutter, the machineability of the material of the gear blank and measurements of power utilized in the operation of cutter 188. The operation of the cutter 188 of the shaper cutter forms teeth 190 on gear blank 186 by a combination of the rotation and reciprocal motion imparted to teeth 192 on the cutter 188. The rotational component for teeth 192 is provided by variable speed motor 194 which provides a controlled electrically activated rotation of the shaper cutter assembly 196. A variable power supply 198 and a control unit 200 provides means for varying and controlling the speed of rotation of cutter 188 within millionths of a second as heretofore described in reference to the invention. The combination of the relative speeds of rotation of cutter 188 and gear blank 186 and the axial motion of cutter 188 are employed to attain the desired helical angle for the gear blank. It will be recognized by those skilled in the art that when a zero helical angle is required gear blank 186 and cutter 188 are rotated at a coordinated speed such that gear blank 186 and cutter 188 are rotated at the same speed where the diameter of cutter 188 and gear blank 186 are the same and modified where the diameters are different to provide the same relative motion. The control and coordination of control 200 for variable speed motor 194 and of control 184 for variable speed motor 180 are controlled by computer 120 through computer interface 34 to produce gears of a desired helical angle and of a preferred configuration.

The reciprocal motion of the shaper cutter 202 is provided by an electrically activated variable speed motor 204 including a power supply 206 and a control unit 208 for monitoring and measuring the power necessary to provide reciprocal movement to cutter 188 of shaper cutter 202. It will now be recognized from the description of the present invention that as teeth 190 are cut on gear blank 186 teeth 192 on cutter 188 became dull and as a result more power is required to operate cutter 188 at the same efficiency. The amperage or power required to operate cutter 188 in conjunction with the helical angle, the number and depth of cutter starts and gear material along with comparative information as to cutter power required when the cutter 188 was new provides computer 120 with information from which to compute cutter sharpness. In addition, the variable power supply may be modified by the computer to increase or decrease power and/or workpiece feed when necessary to compensate within predetermined parameters the power necessary to maintain a uniform or predetermined cutter operation. In the preferred embodiment of the invention indexing is provided for within millionths of a second by the shaper cutter but reciprocal power is maintained at a predetermined maximum and when the power required to operate the cutter reaches maximum amperage, the computer issues instructions to replace or resharpen cutter 188.

The vertical position of cutter 188 with respect to gear blank 186 may be monitored in a variety of ways known to those skilled in the art. One method is to provide a tachometer 210 which may be mounted to a gear 212 in order to monitor the axial position of gear 214 which is driven by variable speed motor 204. It will of course be recognized that one method of providing reciprocal motion of cutter support 202 is by the axial rotation of gear 214 by motor 204 in a rack 216 associated to shaper cutter support 202.

In a manner similar to the one described with reference to the hobbing machine the tachometer 210 can monitor and transmit information as to the vertial position of the shaper cutter support 202 to the computer interface 34 via a lead 218. Similarly information to and from control units 184, 200 and 208 are connected to computer interface 34 via leads 220, 222, and 224 respectively. The operation and control of variable speed motors 180, 194, and 204 is correlated with information provided by tachometer 210, and the amperage monitored by control 208 and in conjunction with the information as heretofore described allows teeth 190 to be cut on gear blank 186. The collection of the aforementioned information as to the actual cutting of the gear in conjunction with comparative information stored in the computer memory allows computer 120 operatively connected to computer interface 34 to correlate the power necessary to operate cutter 188 with the number and depth of teeth 190 being cut on workpiece 188 to provide gears of superior configuration.

Figure 11:
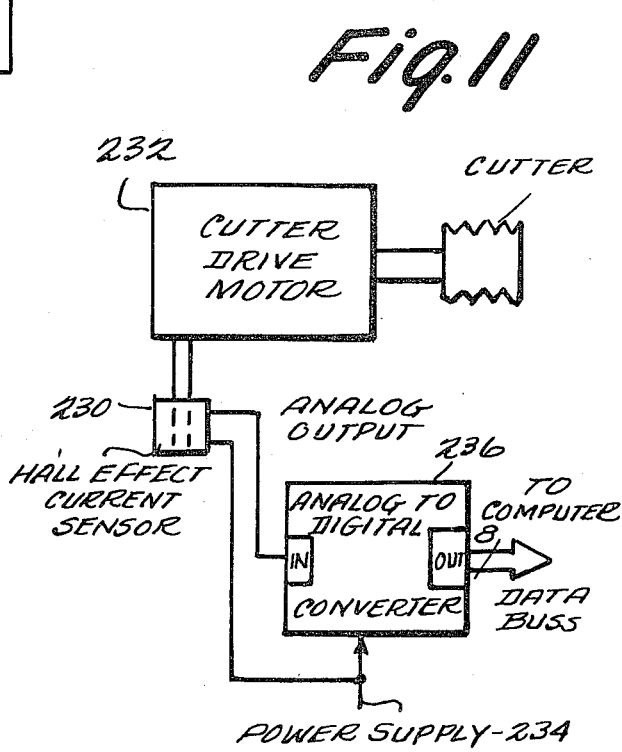
FIG. 11 is a diagrammatic illustration of one form of a cutter power sensor circuit for monitoring and controlling cutter power in accordance with the invention.

Referring now to FIG. 11 one form of a cutter power sensor circuit of a type known to those in the art is illustrated in which a Hall effect current sensor 230 is operatively connected to a cutter drive motor 232 which may for example be an electrically controlled variable cutter drive speed motor such as 38 for hob cutter 24 of FIG. 1 or shaper cutter support 202 of FIG. 10. Hall effect current sensor 230 is also operatively connected to a variable power supply 234 and an analog to digital converter 236 which is part of computer interface 34 and which has as heretofore been described is operatively connected to computer 120.

The shaper cutter modified in accordance with the invention allows a wide variety of gears to be constructed in accordance with the present invention such as internal gears, spur gears or gears with straight teeth. The set up and programming of the shaper cutter is similar to the set up of the hob cutter as heretofore described in relation to rotational axis control and measuring devices for determining the position of the cutter in relation to the gear blank and the programming of the computer to determine the last position of the cutter to provide a more uniform gear by monitoring and controlling power and cutter shift in relation to the material of the gear blank.

The present invention may be implemented in a variety of ways to achieve the benefits of the present method of gear cutting. It will further be recognized by those skilled in the art that the present invention may be adapted to provide a wide variety of gears by utilizing traditional gear cutting machines and may be utilized in bevel gear cutting machinery and shaper cutters. The present invention, it will be recognized, may be designed to provide for the production of helical gears in shaper cutters without the use of cams. The present method of gear cutting eliminates the change gears in hobbing machines, shaper cutters and the like and eliminates cams in shaper cutters while allowing gears of increased precision to be manufactured by utilizing variable speed electric motors to correlate and control the proper indexing operation of gear cutting machines within millionths of a second. Gear cutting machines constructed in accordance with the invention furthermore provide for increased production of optimally designed gears while reducing the time and error incumbent in prior art techniques. The present invention for example, in application to operations involving the mass production of gears significantly contributes to the accuracy and speed of production of improved gears. In small scale operations involving the production of specialty gears the invention significantly reduces set up time and the calculations necessary to cut a desired gear so that typically 4 hours work can be done in one hour and work that heretofore required one day can be accomplished in about two hours.

These and other advantages of the invention and the implementation of the invention in a variety of modes will occur to those of ordinary skill in the art in applying the advantages provided by the invention to hobbing machines, shaper cutters and bevel cutting equipment. The present invention may furthermore be modified by utilizing a plurality of shaper cutters or shavers while achieving the benefits provided by the present invention. These and other modifications and applications of the present invention may be made within the spirit and scope of the invention as defined in the appended claims.

What is claimed is:

1. A method of cutting gears of increased accuracy comprising:
   (a) cutting a gear blank with an electrically activated variable speed cutter having an electrically activated means for providing a variable speed cutter shift;
   (b) measuring the units of power actually expended in the operation of said electrically activated variable speed cutter;
   (c) employing an electrically activated variable speed means for providing the workpiece feed of said gear blank;
   (d) electronically comparing and correlating said units of power actually expanded with a predetermined value of units of power ideally required for the material and size of said gear blank, said workpiece feed and said variable speed cutter shift and the new or sharpened condition of the cutter said predetermined value obtained by calculating, comparing and recording units of power ideally expended in cutting an ideal gear given the material and size of the gear blank, workpiece feed and a predetermined uniform rate of cutter shift;
   (e) electronically increasing or decreasing said units of power actually expended, said variable speed cutter shift said variable workpiece feed of the gear blank or a combination thereof during the cutting of said gear blank in response to said electrically compared predetermined value of units of power ideally required and said units of power actually expended to provide the necessary chip removal to duplicate said ideal gear.

2. The method of cutting gears of increased accuracy of claim 1 wherein said step of electrically comparing said power with a predetermined value further includes a comparison of the number of cutter starts on said gear blank with said predetermined value.

3. The method of cutting gears of increased accuracy of claim 1 wherein said step of electrically comparing said power with a predetermined value further includes a comparison of the helical angle of the cut gear with said predetermined value.

4. The method of cutting gears of increased accuracy of claim 1 further comprising the step of calculating, comparing and recording the amount of cutter shift in conjunction with the units of power ideally expended in the operation of said cutter and thereafter varying said power, said variable workpiece feed or a combination thereof to maintain said calculated cutter shift.

5. The method of cutting gears of increased accuracy of claim 4 further comprising the recording of the axial position of said cutter at the beginning and end of said gear cutting.

6. A method of cutting gears and prolonging cutter life comprising:
  (a) electrically controlling a variable speed cutter having a first electrically activated variable speed means for controlling cutting speed and a second variable speed means for providing variable speed cutter shift;
  (b) electrically measuring and calculating the units of power expended in relation to a predetermined amount of cutter shift of an electrically activated variable speed cutter for generating a desired gear profile in relation to the size and material of the gear blank, feed rate and the new or resharpened condition of the cutter to provide a predetermined value of power ideally expended in cutting a gear;
  (c) electrically controlling an electrically activated variable speed means for providing a variable workpiece feed for a gear blank;
  (d) measuring the amount of variable power actually expended during the operation of said variable speed cutter;
  (e) electrically comparing said variable power actually expended during the operation of said variable speed cutter with said predetermined value; and
  (f) varying said variable workpiece feed, said variable power during the operation of said cutter and said cutter shift to vary said variable power actually expended in correlation with said predetermined value of the units of power ideally expended in relation to the amount of said cutter shift to provide a predetermined gear profile for the gear blank workpiece.

7. The method of cutting gears and prolonging cutter life of claim 6 further comprising the step of measuring and correlating the outside diameter of the gear blank, the number of cutter starts and the helical angle of the blank in calculating and varying the amount of cutter shift of said variable speed cutter.

8. The method of cutting gears and prolonging cutter life of claim 6 wherein said step of electrically measuring and calculating of the amount of shift of a variable speed cutter further comprises electrically comparing said variable power with a predetermined value which includes the depth and size of the gear teeth and the machineability of the material from which said teeth are cut.

9. The method of cutting gears and prolonging cutter life of claim 6 further comprising providing cutter shift in both a clockwise and counterclockwise direction during cutter operation to further increase cutter life.

10. The method of cutting gears and prolonging cutter life of claim 9 further comprising recording of the axial position of the cutter as determined by cutter shift at the end of each gear cutting.

11. The method of cutting gears and prolonging cutter life of claim 6 further comprising utilizing the entire axial shift of said cutter.

12. A method of hobbing which provides gears of increased accuracy while improving hob cutter life comprising:
  (a) electrically measuring and calculating the units of power expended in relation to a predetermined amount of hob shift necessary to generate an optimal gear tooth profile in relation to the size and material of a gear blank, feed rate and the new or resharpened condition of said hob to provide a predetermined value of power ideally expended in cutting a desired gear;
  (b) electrically controlling the variable power to rotate an electrically activated variable speed hob cutter and electrically controlling an electrically activated variable speed hob shift;
  (c) electrically controlling an electrically activated variable feed rate of a workpiece to said hob cutter;
  (d) measuring the units of power actually expended to rotate said variable speed hob cutter;
  (e) electrically comparing said variable power actually expended with said predetermined value; and
  (f) electronically increasing or decreasing said variable feed rate and said variable power for the rotation of said hob cutter and said hob shift in correlation with said predetermined value to duplicate the cutting conditions and said power expended in cutting said desired gear in generating an optimal tooth profile.

13. The method of hobbing of claim 12 for providing gears of increased accuracy while improving hob cutter life further comprising measuring the distance of the hob cutter to the center of the gear blank and computing optimum gear profile.

14. The method of hobbing of claim 13 for providing gears of increased accuracy while improving hob cutter life further comprising measuring the width of the gear face and computing optimum gear profile and cutting positions to reduce cutting time.

15. A gear cutting machine comprising:
  (a) a workpiece support, said workpiece support including a first electrically controlled variable speed electric motor for providing variable workpiece feed and impulses corresponding to workpiece feed;
  (b) driving means wherein said driving means comprises a second variable speed electric motor for driving an electrically activated variable speed cutter said driving means further including a third electrically activated variable speed motor for varying the shift of said variable speed cutter including a cutter support providing separate cutter rotation drive and cutter shift displacement drive and wherein said second variable speed electric motor is operatively connected to said cutter rotation drive and said third electrically activated variable speed motor is operatively connected to said cutter shift displacement drive;
  (c) an electrical controller for measuring and providing impulses of increases and decreases in drive power utilized in operating said second variable speed electric motor and for increasing or decreasing the speed of said first and said third variable speed electric motors;
  (d) an electrical central processing unit for receiving and comparing said impluses received from said controller with predetermined values from a main memory unit of the computer and generating corrective power impulses for said second variable speed electric motor or for increasing the speed of said third variable speed electric motor; and (e) a computer having a main memory unit with predetermined value of units of power ideally required for the material and size of the gear blank, workpiece feed and said shift of said variable speed shift to provide signals to said electrical central processing unit for computing the necessary change or changes in power for driving said electrically activated cutting element and for increasing or decreasing the speed of said third variable speed electric motor and providing corrective impulses to said electrical controller wherein said computer main memory unit in combination with said central processing unit varies said power for said first variable speed motor and varies the speed of said third variable speed motor in response to a detected change in the power utilized for driving said second motor within the response time of the computer and the electrical circuits that is accomplished within millionths of a second to provide the necessary changes in drive power and cutter shift during the cutting of the gear blank to duplicate a previous gear cutting operation.

16. The gear cutting machine of claim 15 further comprising an optical encoder for sensing and generating impulses of the number and depths of cuts on said workpiece.

17. The gear cutting machine of claim 15 further comprising a second optical encoder for measuring and providing impulses as to the outside diameter of said gear blank and positioning said cutter in response thereto.

18. The gear cutting machine of claim 17 wherein said computer includes programmable means for providing the optimal amount of cutter shift required to generate an optimal gear profile.

19. The gear cutting machine of claim 18 further comprising an optical encoder for monitoring and recording the last axial rotational position of the cutter and a memory in said computer for retrieving and repositioning said cutter with respect to further gears to be cut by said cutter.

20. The gear cutting machine of claim 18 wherein said third electrically activated electrical motor for providing shift of said cutter provides travel in both clockwise and counter-clockwise directions during operation to provide increased cutter life.

21. A gear cutting machine for cutting gears of increased accuracy comprising:

(a) a variable speed cutter including a cutter support providing separate cutter rotation drive and cutter shift displacement drive wherein said cutter rotation drive is driven by a first variable speed electric motor providing rotational drive and wherein said cutter shift displacement drive is driven by a second variable speed electric motor for providing shift for said variable speed cutter;

(b) a controller for measuring and varying the power for driving said first variable speed electric motor and the speed of said second variable speed electric motor of said variable speed cutter;

(c) a workpiece support wherein said workpiece support is driven by a third variable speed electric motor to provide workpiece feed; and (d) a central processing unit for providing instructions to said controller and controlling said variable speed cutter by comparing the power actually required to drive said cutter with a predetermined ideal power value and varying said power for driving said first variable speed electric motor and varying the speed of said second variable speed electric motor in response to a detected change in the power utilized for driving said first motor to provide the necessary changes in drive power and cutter shift to duplicate a priviously cut gear in accordance with a predetermined cutting program.

22. The gear cutting machine for cutting gears of increased accuracy of claim 21 wherein said workpiece feed includes an index drive driven by a separate variable speed electric motor.

23. The gear cutting machine for cutting gears of increased accuracy of claim 22 wherein said index drive is controlled by said controller and said central processing unit for controlling said variable speed cutter.

24. The gear cutting machine for cutting gears of increased accuracy of claim 21 wherein said central processing unit is programmed for receiving and correlating power utilized in the operation of said cutter in conjunction with the material of the gear blank and the size and number of teeth cut on said workpiece.

25. The gear cutting machine for cutting gears of increased accuracy of claim 21 further comprising an optical encoder for obtaining and monitoring measurements for the axial position of the side faces of a workpiece, the thickness of the said workpiece and center distance of said workpiece.

\* \* \* \* \*